(12) United States Patent
Kobayashi et al.

(10) Patent No.: US 7,295,339 B2
(45) Date of Patent: Nov. 13, 2007

(54) IMAGE FORMING APPARATUS

(75) Inventors: Hidenori Kobayashi, Shizuoka-ken (JP); Ryosuke Kojima, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1023 days.

(21) Appl. No.: 10/391,542

(22) Filed: Mar. 19, 2003

(65) Prior Publication Data
US 2004/0199862 A1 Oct. 7, 2004

(51) Int. Cl.
*G06F 15/00* (2006.01)
*G06K 1/00* (2006.01)

(52) U.S. Cl. .................. 358/1.18; 358/1.15; 358/1.16; 358/1.12; 382/187; 382/188; 382/189; 382/100; 382/119; 382/121; 250/556; 399/79

(58) Field of Classification Search .............. 358/1.18, 358/1.15, 1.16; 382/382, 187, 188, 100, 382/119, 121, 189; 375/225; 399/79; 283/91
See application file for complete search history.

(56) References Cited

U.S. PATENT DOCUMENTS

| | | | | |
|---|---|---|---|---|
| 5,257,074 A | * | 10/1993 | Kamei | 382/187 |
| 6,118,889 A | * | 9/2000 | Izuno et al. | 382/119 |
| 6,307,955 B1 | * | 10/2001 | Zank et al. | 382/121 |
| 6,333,996 B1 | * | 12/2001 | Kato | 382/189 |
| 6,633,672 B1 | * | 10/2003 | Guzik et al. | 382/189 |
| 6,640,007 B1 | * | 10/2003 | Niie et al. | 382/188 |
| 6,692,030 B1 | * | 2/2004 | Phillips | 283/91 |
| 6,738,491 B1 | * | 5/2004 | Ikenoue et al. | 382/100 |
| 6,760,369 B1 | * | 7/2004 | Chida | 375/225 |
| 6,782,217 B1 | * | 8/2004 | Ando | 399/79 |
| 7,038,228 B2 | * | 5/2006 | Hasegawa et al. | 250/556 |

FOREIGN PATENT DOCUMENTS

| | | |
|---|---|---|
| JP | 3-136165 | 6/1991 |
| JP | 10-260920 | 9/1998 |
| JP | 10-293858 | 11/1998 |

* cited by examiner

*Primary Examiner*—King Y. Poon
*Assistant Examiner*—Satwant Singh
(74) *Attorney, Agent, or Firm*—Foley & Lardner LLP

(57) ABSTRACT

An image forming apparatus of the present invention comprises a function selection/designation section that obtains the designation of selection of a signed-document creation mode for creating at least signed authentic documents and/or copies thereof, a signature position designation section that obtains the designation of a signature position on printing sheets, a signature input section that obtains signature information input by handwriting, a signature temporary storage section that temporarily stores the signature information from the signature input section, an image obtaining section that obtains image data of an original to be provided with the signature, a signature/image synthesizing section that synthesizes the signature information in the signature temporary storage section and the image data in the image obtaining section so that the signature is provided at the designated signature position on the printing sheet, and a printout section that prints out signed documents based on the data synthesized in the signature/image synthesizing section, according to the signed-document creation mode selected and designated, in such a manner that a designated number of signed authentic documents are discriminated from their copies.

9 Claims, 9 Drawing Sheets

IMAGE FORMING APPARATUS

BACKGROUND OF THE INVENTION

The present invention relates to an image forming apparatus, and can be applied, for example, to an image forming apparatus that is provided with operating means for handwriting, which the user inputs by writing on a touch panel or the like, and that attaches signature information to a plurality of documents, and outputs it.

Conventionally, a technology for attaching a signature which a user inputs by handwriting to a plurality of documents and outputting it is disclosed, for example, in Japanese Unexamined Patent Application Publication No. 3-136165, and so on.

In Japanese Unexamined Patent Application Publication No. 3-136165, it is disclosed that additional information that has been created according to a predetermined rule which only the signer himself/herself and concerned persons know is added to a signature which the user has input, at a predetermined position, and is attached to documents as a piece of signature information to be output.

In this way, although a conventional document creation method, in which a signature input by the user is attached to a plurality of documents, can be applied, it is difficult to determine whether each document having the signature attached thereto is an authentic document or a copy.

In other words, a plurality of copies that are the same as an authentic document in appearance can be made. Thus, the copies may undermine the credibility of the authentic document.

Further, the conventional document creation method stores the signature itself, which has been input once, in storage means of an apparatus, and the signature can be read out to be utilized for other documents upon request from the user, which causes a security problem in that the signature can be read out without the permission of the signer himself/herself and used.

SUMMARY OF THE INVENTION

It is an object of the present invention to provide an image forming apparatus that can prevent leakage of a signature that is input by a user by handwriting, which makes it easy to discriminate between a signature-provided (hereinafter, referred to as 'signed') authentic document and a copy thereof.

The image forming apparatus according to the present invention comprises a function selection/designation section that obtains the designation of selection of a signed-document creation mode for creating at least a signed authentic document and/or a copy thereof, a signature position designation section that obtains the designation of a signature position on a printing sheet, a signature input section that obtains signature information input by handwriting, a signature temporary storage section that temporarily stores the signature information from the signature input section, an image obtaining section that obtains image data of an original to be provided with the signature, a signature/image synthesizing section that synthesizes the signature information in the signature temporary storage section and the image data in the image obtaining section so that the signature is provided at the designated signature position on the printing sheet, and a printout section that prints out a signed document or documents based on the data synthesized in the signature/image synthesizing section, according to the signed-document creation mode selected and designated, in such a manner that a designated number of signed authentic documents are discriminated from their copies.

BEST MODE FOR CARRYING OUT THE INVENTION

Preferred embodiments of image forming apparatuses according to the present invention will be described below with reference to the accompanying documents.

(A) First Embodiment

First of all, a first embodiment will be described for the case where a digital copy machine is applied to an image forming apparatus according to the present invention, with reference to FIGS. 1 to 4.

Figure 1:
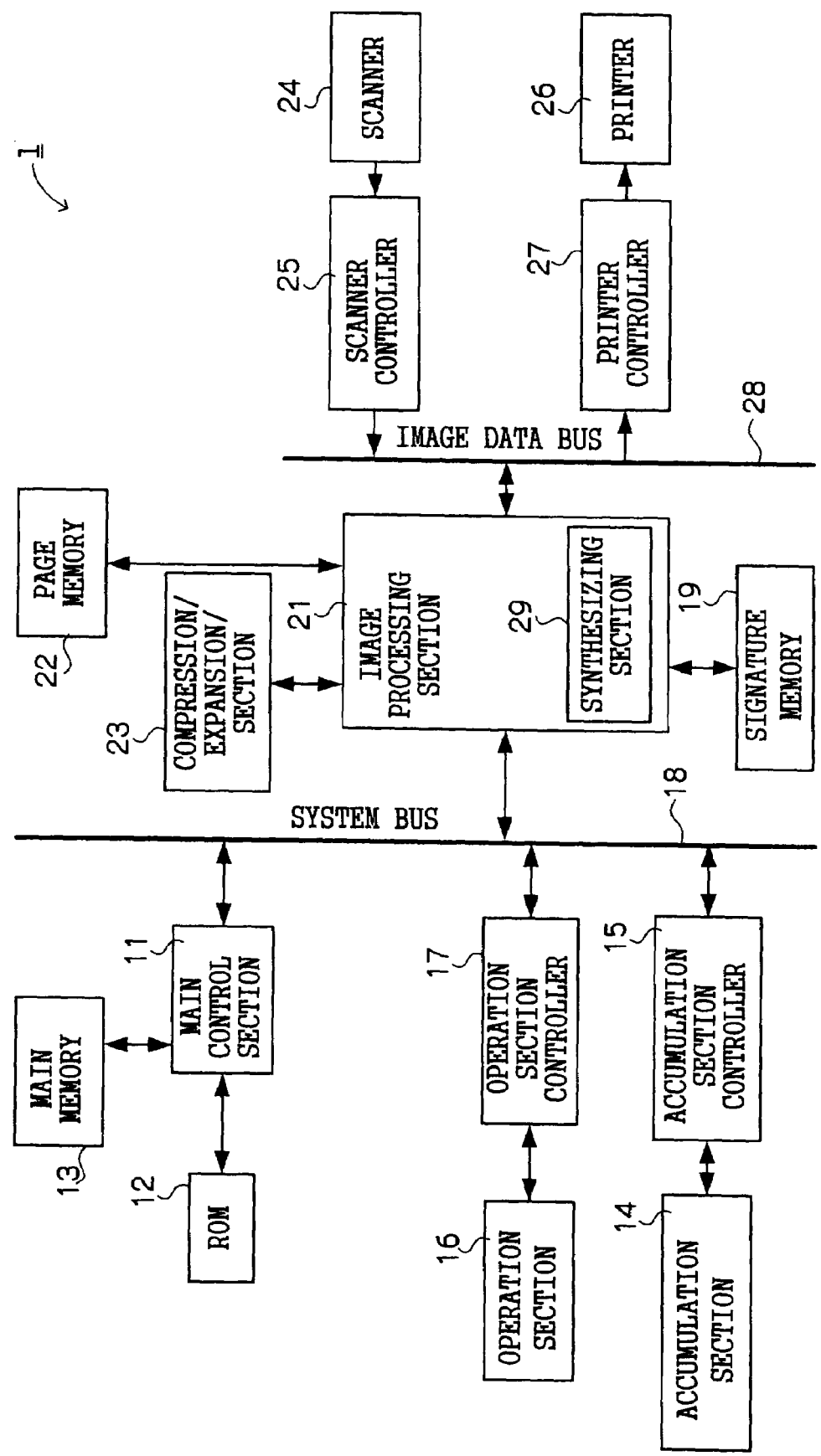
FIG. 1 is a block diagram showing the internal configuration of a digital copy machine according to a first embodiment.

FIG. 1 is a block diagram of the inner structure of the digital copy machine according to the first embodiment.

As shown in FIG. 1, the digital copy machine 1 is comprised of a main control section 11 that controls the entire apparatus, a ROM 12 that stores a control program, a main memory 13 that stores the loaded control program, an operation section 16, an operation section controller 17, an accumulation section 14, an accumulation section controller 15, a signature memory 19, an image processing section 21, a page memory 22, a compression/expansion section 23, a scanner 24, a scanner controller 25, a printer 26, and a printer controller 27.

The main control section 11, the operation section controller 17, the accumulation section controller 15, and the image processing section 21 are connected through a system bus 18. The scanner controller 25, the printer controller 27, and the image processing section 21 are connected through an image data bus 28.

The operation section 16 is comprised of at least a touch panel and a signature position determination section, and is means for user operation of apparatus functions and the like. An example of the outline configuration of the operation section 16 is shown in FIG. 2, and the operation section 16 will be described with reference to FIG. 2.

Figure 2:
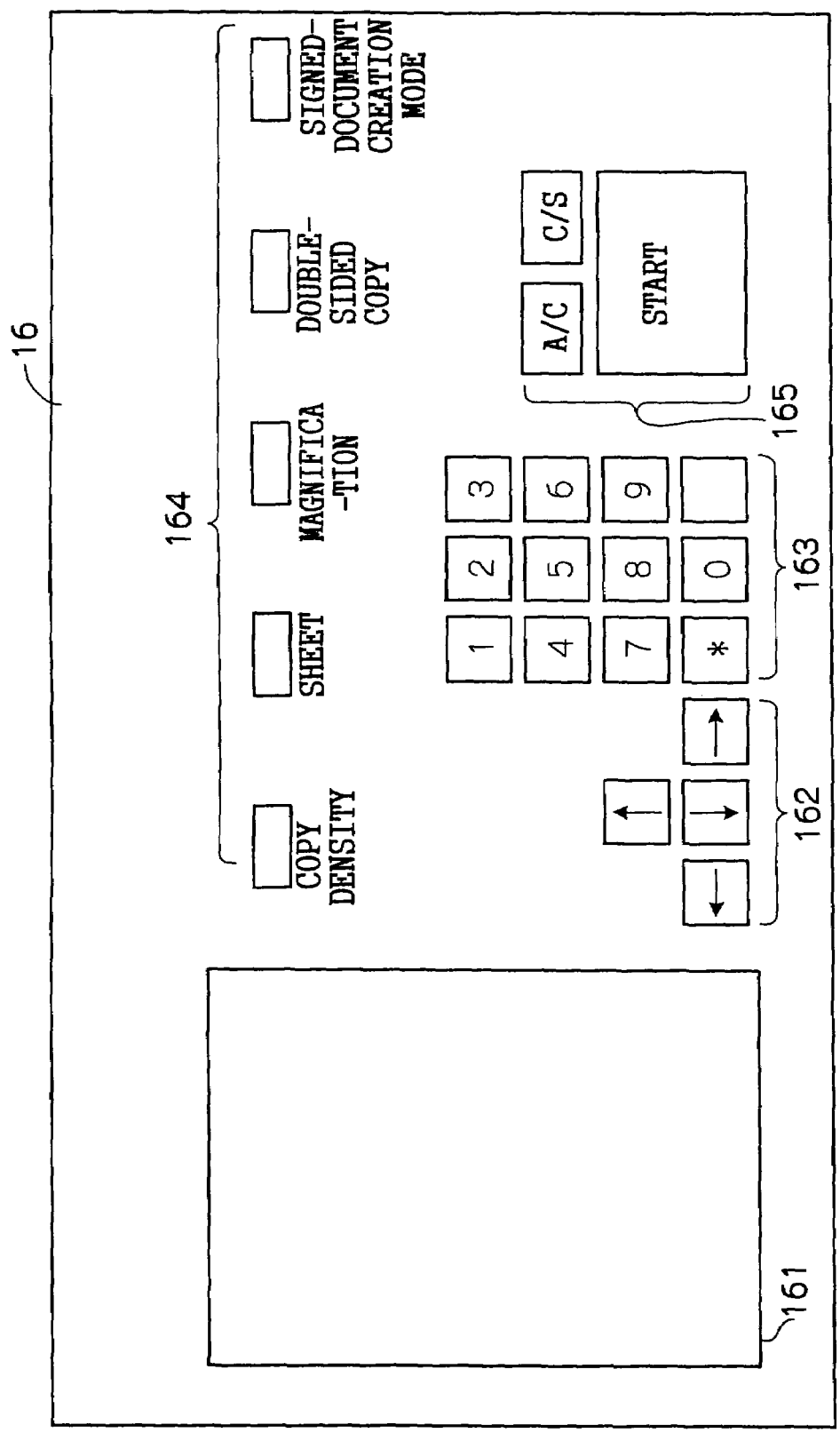
FIG. 2 is a schematic view showing an example of the outline configuration of an operation section.

As shown in FIG. 2, the operation section 16 is comprised of at least a touch panel 161, a signature position determination section 162, a tenkey 163, function mode selection keys 164, and start/clear keys 165, and so on.

The touch panel section 161 obtains signature information (bitmap information) such that the user writes his/her signature by handwriting on the touch panel, using a pen, a finger, or the like. The signature information obtained by the touch panel 161 is stored in the signature memory 19 through the operating controller 17.

In the present embodiment, although an image display section and a handwriting input section are integrated as the touch panel 161, the image display section and a contact input section may have independent and separate configurations.

As a method of the touch panel 161, conventional methods such as a pressure sensing method, a capacitance detection method, or a magnetic detection method, can be applied. The present embodiment will be described with the assumption that an analog pressure sensing method is employed so that a signature signed by the user is obtained as a high resolution image.

The signature position determination section 162 is operation keys for the user as to determine at which position of a sheet the signature is to be printed. With regard to the method of determining the signature position, for example, two dimensional coordinate axes may be set on a printing sheet so that the signature position can be determined by designating a region based on position coordinates of the signature. In this case, for example, a schematic image view (printing preview) of the position on the sheet where the signature is to be located may be displayed on the screen of the touch panel 161 so that the user can designate the position of the signature by operating the signature position determination section 162 while looking at the printing preview.

Further, the signature position determination section 162 may be provided with a signature reduction/expansion function that adjusts the size of the signature on the printing sheet, a signature angle adjusting function that adjusts the angle of the signature to be attached to the printing sheet, and the like.

The function mode selection keys 164 are keys for the user to select functions of the apparatus.

As shown in FIG. 2, for example, there are conventional function modes such as a copy density adjusting function (in FIG. 2, shown as 'copy density') that adjusts the density of toner in printing copy documents, a sheet size adjusting function (in FIG. 2, shown as 'sheet') that adjusts the sheet size, a magnification function (in FIG. 2, shown as 'magnification') that adjusts the magnification of the printing size of copies, a double-sided copying function (in FIG. 2, shown as 'double-sided copying') that carries out printing of a plurality of originals on both sides of copies.

The signed-document creation key among the function mode selection keys 164 is a key that is pressed for printing signed documents and thus starts the function (referred to as 'the signed-document creation mode') of printing authentic documents and/or copies thereof.

The number of printing sheets that the user designates, such as the number of printing sheets of authentic documents for printing signed authentic documents or the number of printing sheets of copies for printing copies of authentic documents, can be designated. Also, in the case of printing both authentic documents and copies, the respective numbers of printing sheets can be designated.

Further, in the case of an original of a plurality of pages, for example, an optional setting of providing a signature only on the first page or an optional setting of providing a signature on all the pages may be carried out.

Still further, for printing a plurality of copies (for example, M copies) of an original of a plurality of pages, for example, it is possible to specify printing N copies (N is an integer.) of signed documents and printing (M-N) copies of documents without a signature.

In the present embodiment, the method of discriminating between signed authentic documents and signed copies is by switching sheets, themselves, to be selected for creating the respective documents. Switching sheets, themselves, to be selected will be described later in detail.

The operation of the tenkey, the operation of the start/clear keys, and the like, are the same as those of conventional functions. The tenkey is, for example, used for input by the user to designate the number of printing sheets for authentic documents and the number of printing sheets for copies, and the start/clear keys are used, for example, to select starting of printing, stopping of printing, deleting functions, or the like.

Coming back to FIG. 1, the operation section controller 17 controls the operation section 16. The operation section controller 17 obtains signature information (bitmap information) signed by the user at the operation section 16, and stores the signature information in the signature memory 19.

The signature memory 19 temporarily stores the signature information from the operation section controller 17. The signature memory 19 deletes the temporarily stored signature information after printing of the temporarily stored signature information is completed. This is to prevent the signature information from being stolen, or the like.

The deletion timing of the signature information in the signature memory 19 is not limited, in general, as long as the security of the signature information is protected, and, for example, in the case where printing of documents on a plurality of sheets is instructed, the timing may be at the completion of document printing of the first sheet thereof, or may be at the completion of document printing of all the sheets.

Further, for example, the signature information may be stored when the power of the digital copy machine according to the present embodiment is on, and deleted when the power is off. In other words, the signature information is deleted after completion of printing or when the power is off.

The present embodiment will be described with the assumption that in the case that a plurality of printing sheets is designated, the signature information is deleted at the completion of document printing of all of the designated number of sheets.

The main control section 11 controls the entire apparatus, loads the control program stored in the ROM 12, and stores the read control program in a predetermined area of the main memory 13. In the present embodiment, the main control section 11 executes programs for the signed-document creation mode and the like.

The ROM 12 is for storing the control program loaded by the main control section 11. The ROM 12 stores a program for boot processing, and other conventional function programs, and in addition, a program for the signed-document creation mode according to the present embodiment.

The main memory 13 stores the control program read out by the main control section 11 from the ROM 12 in a predetermined area.

The image processing section 21 obtains image data from the scanner controller 25 through the image data bus 28 and performs a variety of image processing operations on the image data. During normal operation, the image data from the scanner controller 25 is temporarily stored in the page memory 22, and, at printing time, the image data read from the page memory 22 is provided to the printer controller 27 through the image data bus 28 and printed.

Responding to a request by the user, a synthesizing section 29 synthesizes signature information with the input image data, and provides the image data including the signature information to the printer controller 27. In this case, the synthesizing section 29 reads out the signature information stored in the signature memory 19, reads out the image data from the page memory 22 or the accumulation section 14, and then synthesizes the signature information and the image data.

In the present embodiment, at printing time, the signature information and the image data are synthesized to be output to the printer controller 27; however, for example, if the user desires printing of a plurality of sheets, synthesized data of the signature information and the image data may be accumulated in the accumulation section 14 and output to the printer controller 27 by obtaining the accumulated synthesized data at each printing time.

The image processing section 21 may be arranged such that the signature information stored in the signature memory 19 is read out, provided to the printer controller 27 as is, that is, without being synthesized with the image data, and the signature is directly printed on a sheet (for example, the original itself). In such a manner, for example, the same signature can be printed on a plurality of originals having different contents.

Further, upon request by the user, the image processing section 21 can provide the image data to the compression/expansion section 23 and have the image data subjected to compression/expansion processing. For example, in the case of creating a copy of an original of a plurality of sheets upon the user's request, the image processing section 21 accumulates image data from the scanner 24 in the accumulation section 14, and thus makes copies of a plurality of sheets, wherein the amount of the image data accumulated in the accumulation section 14 is generally compressed. Therefore, the image processing section 21 provides the image data to the compression/expansion section 23 to have the image data subjected to compression processing, and in the case of accumulating the compressed image data in the accumulation section 14 and then using the image data in the accumulation section 14, the image processing section 21 reads out the compressed image data from the accumulation section 14, and provides the compressed image data to the compression/expansion section 23 to have the compressed image data subjected to expansion processing.

The page memory 22 receives the image data from the image processing section 21, and temporarily stores the image data in units of pages.

The compression/expansion section 23, if necessary, receives the image data from the image processing section 21, and performs compression processing or expansion processing on the image data. The compression/expansion processing performed by the compression/expansion section 23 can compress the amount of image data accumulated in the accumulation section 14, and expand the compressed image data to the initial image data, accordingly the compression/expansion processing can be widely applied.

The compression/expansion section 23 may be arranged such that the image data including the signature information is subjected to the compression processing and accumulated in the accumulation section 14, and, when it is used, it is subjected to the expansion processing and restored to the initial image data including the signature information to be used.

The scanner 24 feeds an original at a predetermined timing, optically reads the original in units of lines in synchronization with the feeding timing of the original, converts the original into electrical signals, and produces image data based on the converted electrical signals. The scanner 24 provides the image data produced by scanning of the original to the scanner controller 25.

The scanner controller 25 controls the scanner 24, and provides the image data obtained from the scanner 24 at a predetermined timing to the image processing section 21 through the image data bus 28.

The printer controller 27 receives the image data from the image processing section 21 through the image data bus 28, provides the image data to the printer 26, and controls the printer 26. When the signed-document creation mode is started upon request by the user, the printer controller 27 performs control such that authentic documents and copies are printed on sheets taken out from different sheet cassettes. The printer 26 has the sheets cassettes mounted in advance. After the signed-document creation mode is selected, the printer controller 27 performs printing control of the printer 26 according to the number of printing sheets (for example, the number of sheets of authentic documents and the number of sheets of copies) designated by the user.

The printer 26 receives the image data from the printer controller 27, forms an image based on the image data, and prints and outputs the image data on prepared sheets under the control of the printer controller 27. The printer 26 is provided with a plurality of sheet cassettes (not shown), including, at least, a sheet cassette for authentic documents and a sheet cassette for copies. The printer 26 is controlled by the printer controller 27 in printing authentic documents and copies to take out sheets from the corresponding sheet cassette and print the authentic documents and the copies, in such a manner that the authentic documents and the copies are discriminated from each other.

In other words, under the control of the printer controller 27, the printer 26 takes out the number of sheets, corresponding to the number of sheets of authentic documents designated by the user, from the sheet cassette for authentic documents and prints the authentic documents, and takes out the number of sheets, corresponding to the number of sheets of copies designated by the user, from the sheet cassette for copies and prints the copies.

Figure 3A:
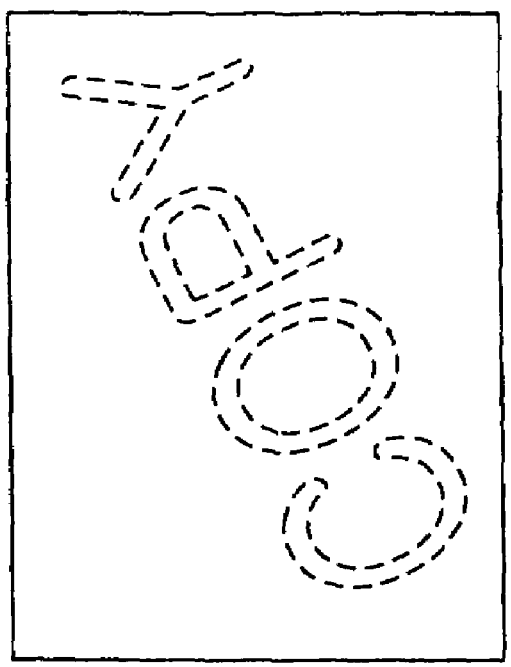
FIG. 3 is an explanatory diagram showing examples of sheets for a copy and an authentic document.
Figure 3B:
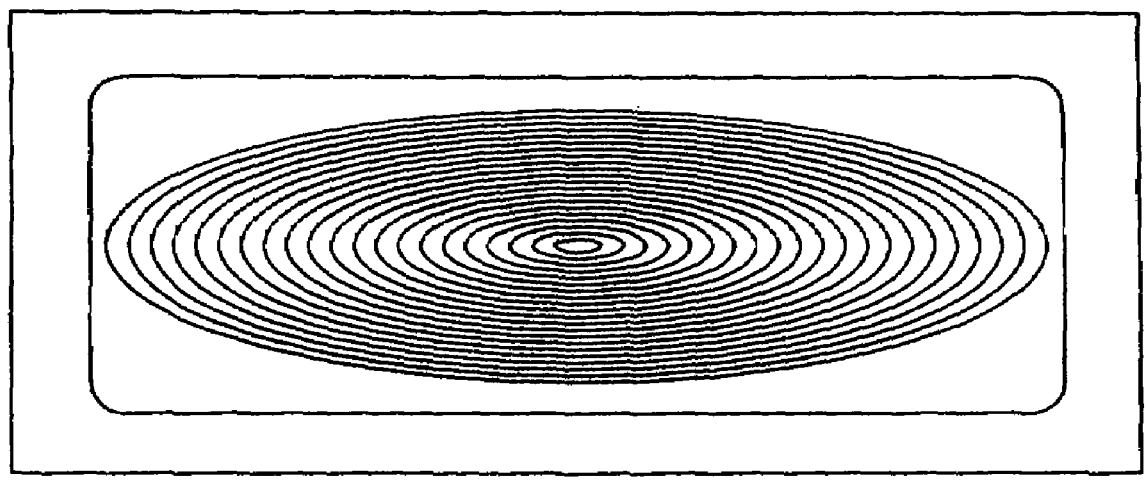

FIGS. 3A and 3B are views showing images of examples of sheets to store in the sheet cassette for authentic documents or in the sheet cassette for copies. FIG. 3A shows an example of a sheet for copies, and FIG. 3B is an example of a sheet for authentic documents.

In the sheet cassette for copies, as shown in FIG. 3A, for example, sheets on which it is described that the sheets are for "COPY" in the entire area or in a part of the sheets may be stored.

Further, in the sheet cassette for authentic documents, for example, in the case of printing authentic documents provided with a special signature for certification or management, special-printing-only sheets may be stored, as shown in FIG. 3B. Or, for example, though not shown, sheets provided with a watermark for authentic documents may be stored.

Still further, the printer 26 may be provided with a sheet cassette that stores sheets for either authentic documents or copies, and they are discriminated by printing on the stored sheets.

The sheets shown in FIG. 3 are only examples; a wide range of sheets to be stored in the sheet cassettes for authentic documents and copies may be used as long as it is distinguishable whether the sheets are for authentic documents or for copies. For example, sheets that are visually distinguishable, so as to allow determination as to which of the two kinds they are, may be applied, or it is possible to use sheets that are not visually distinguishable, but, for example, have been specially processed optically or magnetically, and on which, when further copying the printed sheets by using a copy machine or the like, letters appear indicating that the copied documents have been copied from copies.

Next, with reference to FIG. 4, the operation of the signed-document creation mode according to the first embodiment will be described.

Figure 4:
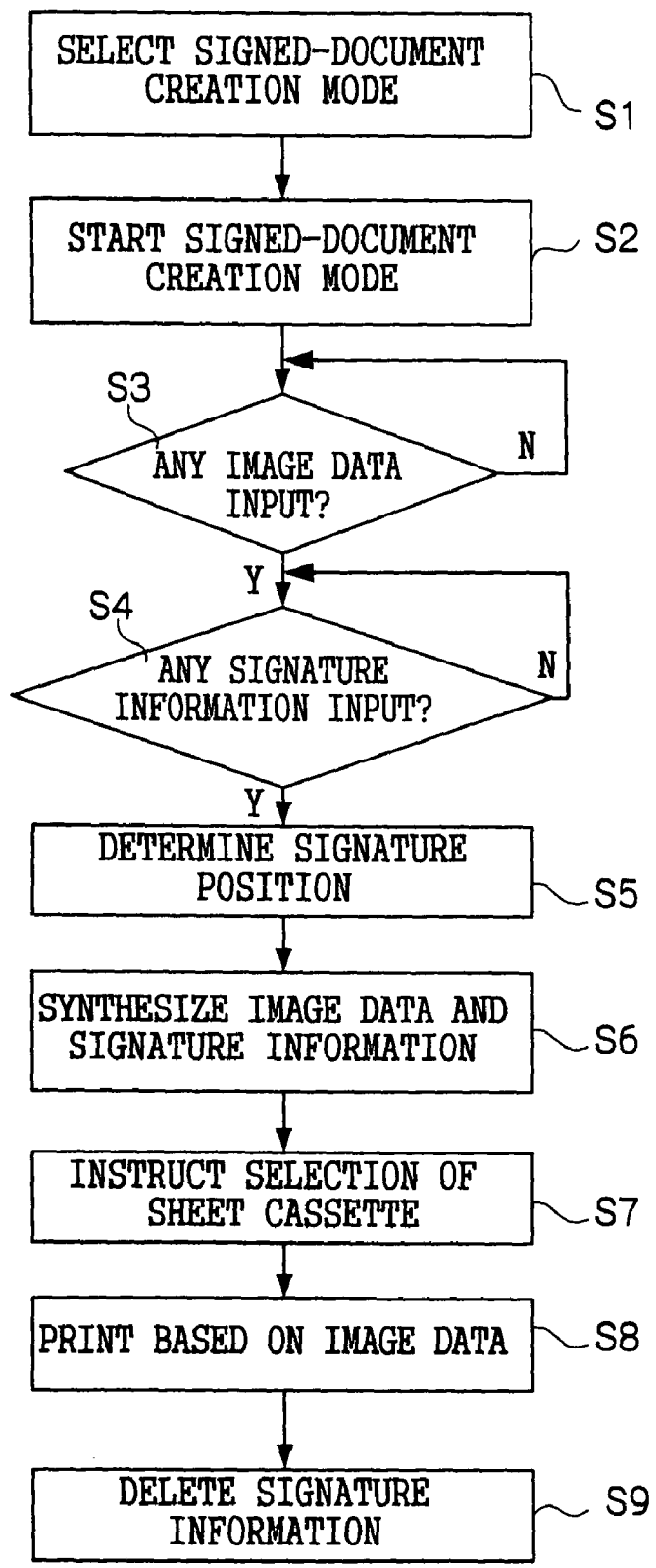
FIG. 4 is a flowchart used to explain the operation of a signed-copy creation mode according to the first embodiment.

In FIG. 4, the case where the user desires to print a sheet of a signed authentic document and a plurality of sheets of signed copies will be described.

First of all, the signed-document creation mode is selected by the user (S1). For example, the "signed-document creation key" in FIG. 2 is selected by the user. Then, the number of printing sheets (for example, one sheet of the authentic document and a plurality of sheets of copies) desired by the user is also input.

When the signed-document creation key is pressed, a program stored in the ROM 12 for the signed-document creation mode is loaded by the main controller 11, and the signed-document creation mode is started (S2).

An original to be provided with a signature is mounted on an original-document table (not shown) of the scanner 24, the original is scanned, and thus image data is produced by the scanner 24 (S3). If image data cannot be input, or correct input has not been carried out, input may be requested again.

This image data is provided to the image processing section 21 through the scanner controller 25, temporarily stored in the page memory 22, and then provided to the compression/expansion section 23 to be processed for compression. The image data processed for compression is accumulated in the accumulation section 14 through the accumulation section controller 15.

Further, a signature is written by the user on the touch panel 161, and the signature information (bitmap information) is provided to the signature memory 19 through the operation section controller 17 (S4). If the signature information cannot be input, input may be requested again.

Although the present embodiment will be described with the assumption that the signature information is input after the image data is input, the image data may be input after the signature information is input.

After the signature information is input, the position at which the signature is to be printed is determined by the user (S5). For example, in FIG. 2, the user can determine the signature position by using the signature position determination section 162.

When the signature position has been determined, the signature information in the signature memory 19 is read out, the image data in the accumulation section 14 is read out, and this signature information and the image data are provided to the synthesizing section 29 of the image processing section 21, where they are synthesized by the synthesizing section 29 to produce image data including the signature information (S6).

When the image data including the signature information has been produced, the printer controller 27 instructs the printer 26 to control the sheet cassettes (S7). This instruction to control the sheet cassettes is designed to use a sheet taken out from the sheet cassette for authentic documents for printing on the first sheet, and use sheets taken out from the sheet cassette for copies for printing on the second and subsequent sheets.

Upon receiving this control instruction, the printer 26 carries out printing on the first sheet using the sheet taken out from the sheet cassette for authentic documents, and then carries out printing on the second and subsequent sheets, using the sheets taken out from the sheet cassette for copy documents (S8).

When the authentic document and the copies have been printed by the printer 26, the signature information stored in the signature memory 19 is deleted (S9).

As described above, according to the first embodiment, the signed-document creation mode is started according to a selection by the user, and the printer 26 prints documents while selecting from the sheet cassettes for authentic documents and copies; thus, it is possible to print the documents clearly such that authentic documents and copies are distinguishable from each other.

Further, according to the present embodiment, by inputting a signature once, one or more sheets of signed authentic documents and/or one or more sheets of signed copies can be created.

(B) Second Embodiment

Next, a second embodiment of an image forming apparatus according to the present invention will be described with reference to FIGS. 5 and 6.

The second embodiment is also described by taking as an example a digital copy machine, as in the first embodiment.

Figure 5:
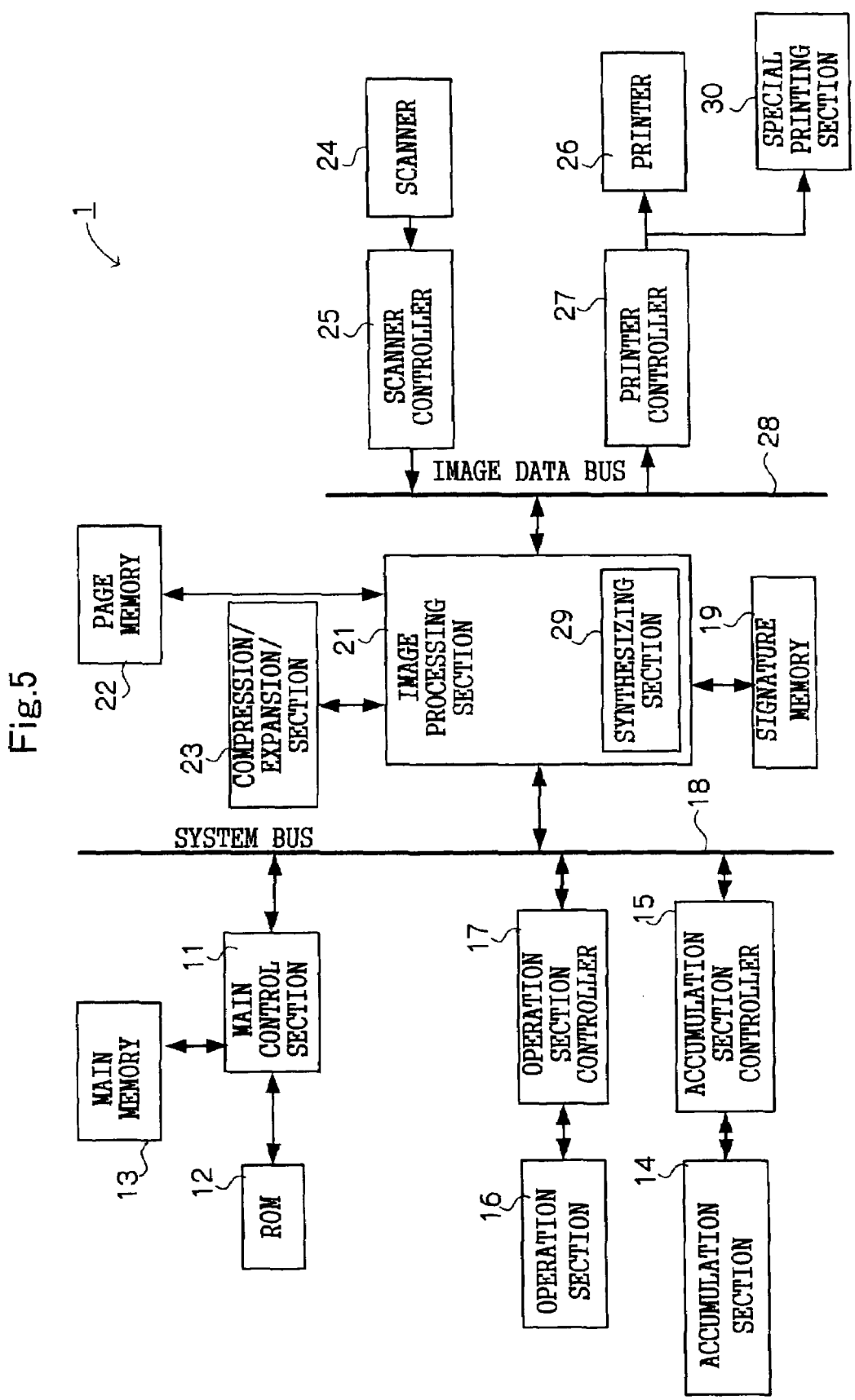
FIG. 5 is a block diagram showing the internal configuration of a digital copy machine according to a second embodiment.

FIG. 5 is a block diagram showing the inner configuration of the digital copy machine in the second embodiment. In FIG. 5, components corresponding to those of the inner configuration of the digital copy machine in the first embodiment shown in FIG. 1 are given the corresponding reference numerals.

As shown in FIG. 5, the second embodiment is different from the first embodiment in that a special printing section 30 is provided. Further, since the special printing section 30 is provided, the operation associated with creating signed documents is also different.

Functions of constituent features different from those in the first embodiment will be described below in detail, and the functions of constituent features described in the first embodiment will be omitted.

The special printing section 30 is controlled by a printer controller 27, and when a signed-document creation mode starts upon request by a user, the special printing section 30 takes out a sheet from a sheet cassette of a printer 26, and carries out special printing on the underlying layer of the sheet. The sheet subjected to special printing is provided to the printer 26, and printing according to image data is performed by the printer 26. Although, in the present embodiment, the printer 26 and the special printing section 30 will be described while showing different configurations for convenience of explanation, the printer 26 may include the special printing function.

The meaning of special printing described here is carrying out special printing on the underlying layers of both or either sheets to be used for authentic documents and/or sheets to be used for copies so that they can be distinguished from each other.

The special printing performed by the special printing section 30 is not limited in general, and for example, for printing copies, the word "COPY" may be printed on the entire part or on a part of the underlying layers of sheets (see FIG. 3A), or for example, for printing authentic documents provided with a special signature for certification or management, a color pattern of a plurality of colors for preventing tampering may be printed on the underlying layers of sheets (see FIG. 3B). Further, in such special printing, printing may be performed on the side opposite to the printing side of document contents, or on both sides.

It is not required that the printer 26 be provided with a sheet cassette for authentic documents and a sheet cassette for copies, as in the fist embodiment. At printing time, the printer 26 receives image data that includes signature information from the printer controller 27, receives a sheet subjected to special printing from the special printing section 30, and then forms and prints an image on the sheet according to the image data that includes the signature information. Printing based on special printing and image data may be carried out in a sequential printing process or in a separate printing process.

Next, the operation of the signed-document creation mode of the second embodiment will be described with reference to FIG. 6. FIG. 6 shows a flowchart of the signed-document creation mode according to the second embodiment.

Figure 6:
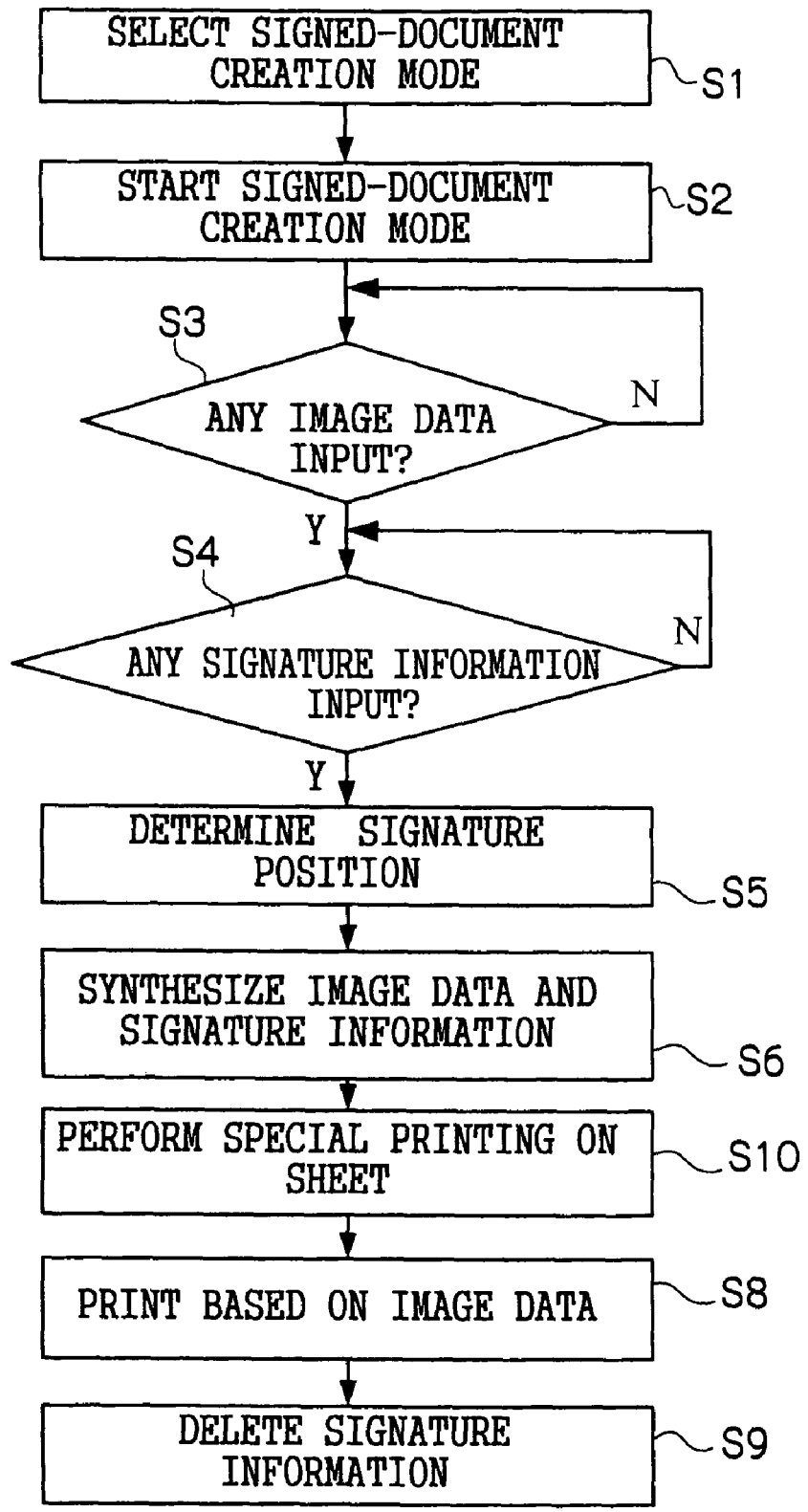
FIG. 6 is a flowchart used to explain the operation of a signed-copy creation mode according to the second embodiment.

As shown in FIG. 6, the operations from selection by the user of the signed-document creation mode to the synthesizing of image data and signature information (S1 to S6) corresponds to FIG. 4 and has been described in the first embodiment; therefore, the operation up to this point is omitted.

After the image data and the signature information have been synthesized, the printer controller 27 instructs the special printing section 30 to carry out special printing for authentic documents or copies.

The special printing section 30 takes out a sheet from the printer 26 in response to an instruction for special printing from the printer controller and carries out special printing for the authentic document or the copy on the underlying layers of the sheet (S10).

The printer 26 receives the sheet subjected to special printing by the special printing section 30, forms an image according to the image data including the signature information from the print controller 27, and thus performs printing on the sheet subjected to special printing (S8).

When the authentic document and the copy have been printed by the printer 26, the signature information stored in a signature memory 19 is deleted (S9).

As described above, in the second embodiment, by providing a special printing section 30, special printing, which allows discrimination between authentic documents and copies, on the underlying layers of sheets for documents with a signature in a sequential printing process is achieved, and thus it possible to clearly distinguish between authentic documents and copies.

(C) Third Embodiment

Next, a third embodiment of an image forming apparatus according to the present invention will be described with reference to FIGS. 7 and 8.

The third embodiment is also described by taking as an example a digital copy machine, as in the first embodiment.

Figure 7:
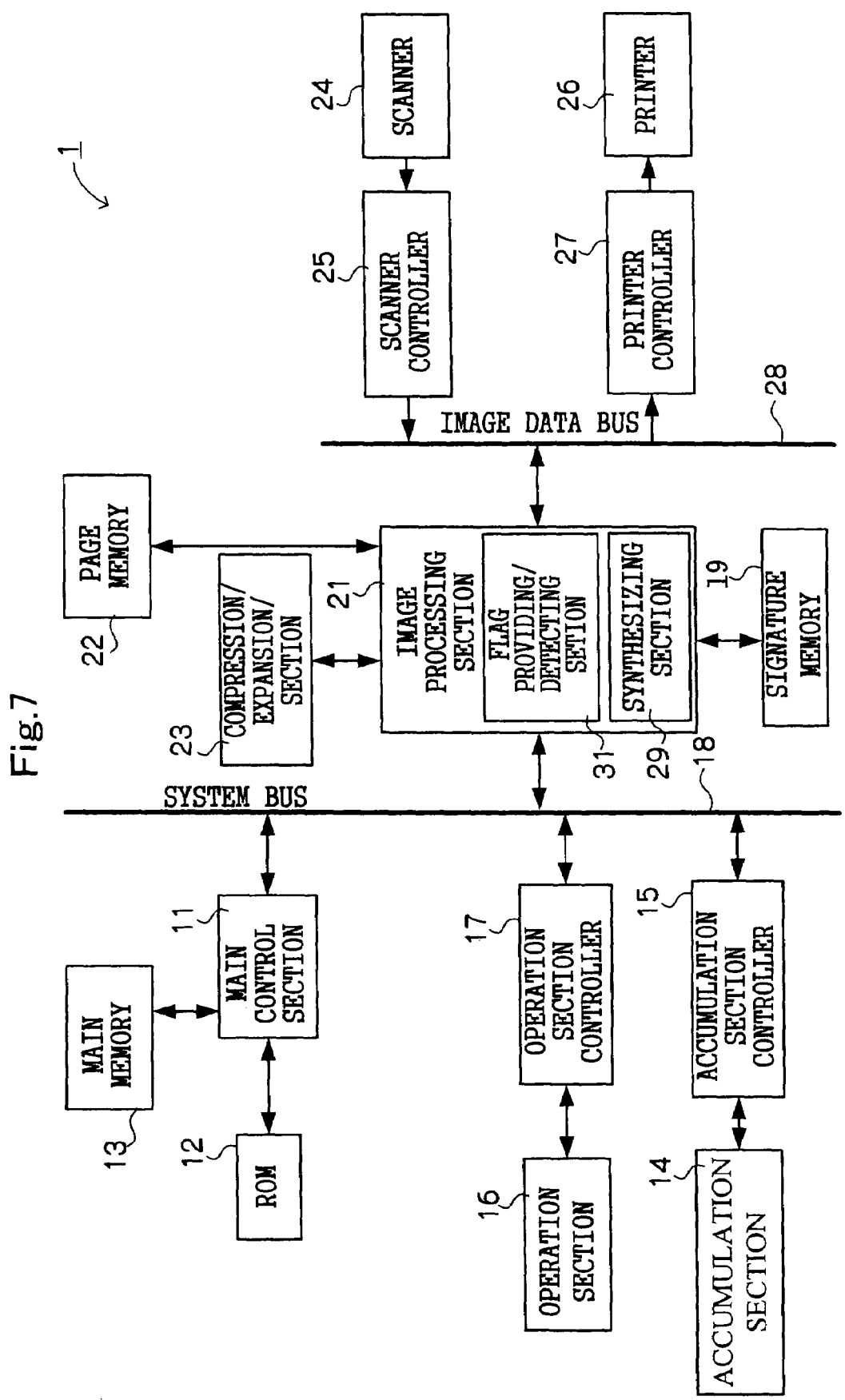
FIG. 7 is a block diagram showing the internal configuration of a digital copy machine according to a third embodiment.

FIG. 7 is a block diagram showing the inner configuration of the digital copy machine in the third embodiment. In FIG. 7, components corresponding to those of the inner configuration of the digital copy machine in the first embodiment shown in FIG. 1 are given the corresponding reference numerals.

As shown in FIG. 7, the third embodiment is different from the first embodiment in that an image processing section 21 is provided with a flag providing/detecting section 31. Further, since the flag providing/detecting section 31 is provided, the operation associated with creating signed documents is also different.

According to an instruction by the user, when the designated last printing sheet is reached, the flag providing/detecting section 31 provides a flag in the image data which shows that printing of authentic documents has been completed. In the case where the user does not instruct printing of authentic documents, the flag providing/detecting section 31 provides a flag in the image data when such an instruction is given.

Further, the flag providing/detecting section 31 determines whether a flag which shows that the end of the authentic documents has been reached is provided in the image data, and if it determines that the flag is provided, the flag providing/detecting section 31 instructs the printer controller 27 to print copies.

The flag providing/detecting section 31 may instruct the print controller 27 to provide the image data with a flag only when printing authentic documents, and prints authentic documents when the flag is detected.

The print controller 27 controls the printer 26 to print copies when instructed by the flag providing/detecting section 31 to print copies, and controls the printer 26 to print authentic documents when no instruction is given by the flag providing/detecting section 31.

As described in the first embodiment, the printer 26 may be provided with a sheet cassette for authentic documents and a sheet cassette for copies to separately take sheets for printing under the control of the printer controller 27, or, as described in the second embodiment, a special printing section 30 may be provided to print documents according to image data after performing special printing on the underlying layers of sheets.

Next, the operation of a signed-document creation mode according to the third embodiment will be described with reference to FIG. 8. FIG. 8 shows a flowchart of the signed-document creation mode in the third embodiment.

Figure 8:
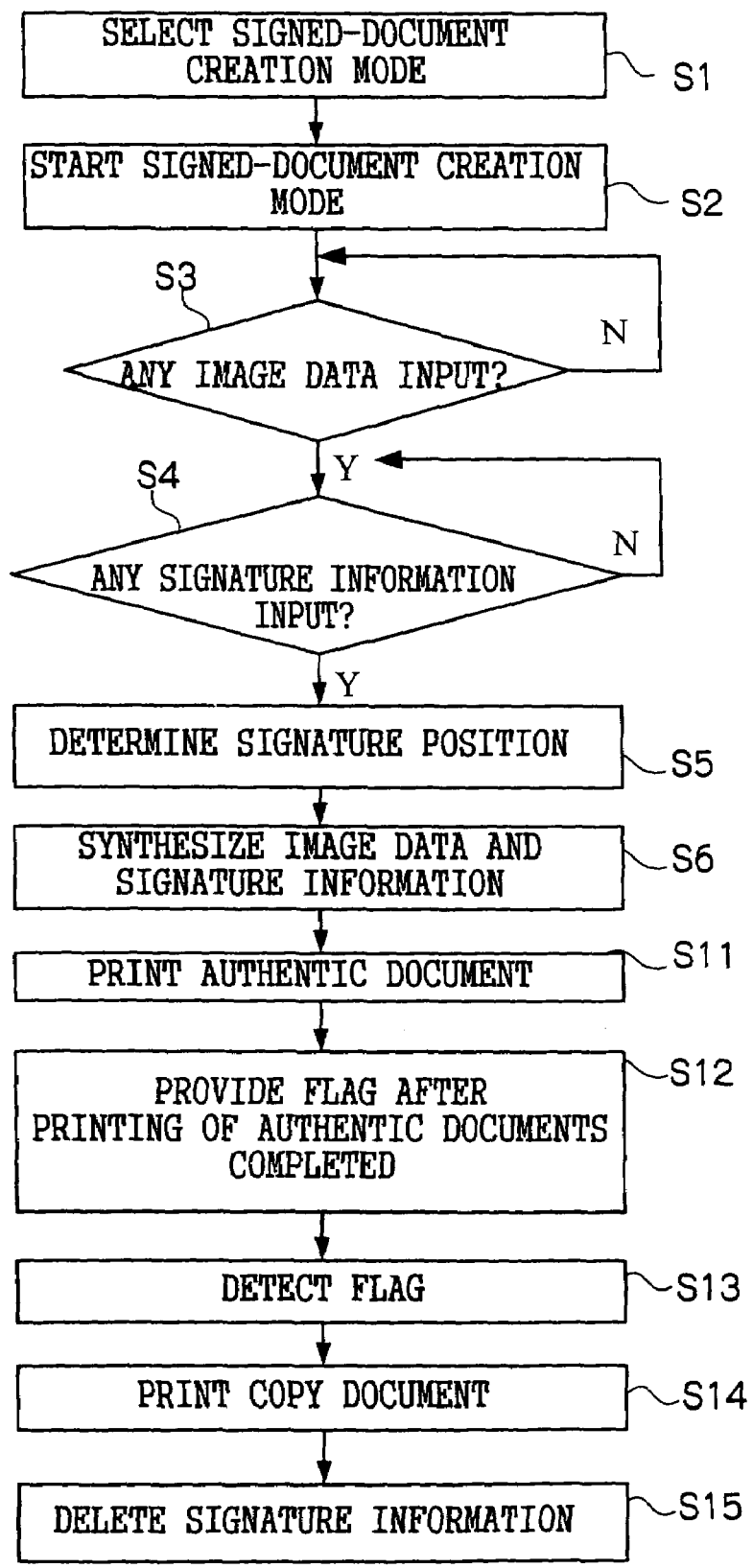
FIG. 8 is a flowchart used to explain the operation of a signed copy document creation mode according to the third embodiment.

As shown in FIG. 8, the operations from selection by the user of the signed-document creation mode to the synthesizing of image data and signature information (S1 to S6) corresponds to FIG. 3 and has been described in the first embodiment; therefore, the operation up to this point is omitted.

After the image data and the signature information have been synthesized, authentic documents are printed according to the number of printing sheets of authentic documents designated by the user (S11).

The flag providing/detecting section 31 then determines whether the image data is provided with a flag, and confirms that a flag has not been detected.

When printing the last sheet designated by the user, the flag providing/detecting section 31 provides a flag, in the image data, that shows that printing of authentic documents has been completed (S12).

The flag providing/detecting section 31 detects the flag of the image data at the next printing (S13), and instructs the printer controller 27 to print copy documents.

The printer controller 27 receives an instruction from the flag providing/detecting section 31, controls the printer 26 to print copies, and thus the copies are printed (S14).

When printing of authentic documents and copies in the numbers designated by the user is completed in such a manner, signature information in a signature memory 19 is deleted (S15).

As described above, according to the third embodiment, by providing a flag providing/detecting section 31, a flag for discriminating between printing of authentic documents and printing copies is provided in the image data, the flag is detected, and thus authentic documents and copy documents can be clearly distinguished.

(D) Fourth Embodiment

Next, a fourth embodiment of an image forming apparatus according to the present invention will be described with reference to FIG. 9.

The fourth embodiment is also described taking as an example a digital copy machine, as in the first embodiment.

In the fourth embodiment, a case will be described wherein, when special printing sheets are set on a sheet cassette mounted on the printer 26, or a sheet cassette for special printing is set, the apparatus enters a preparation mode for creating signed documents.

Figure 9:
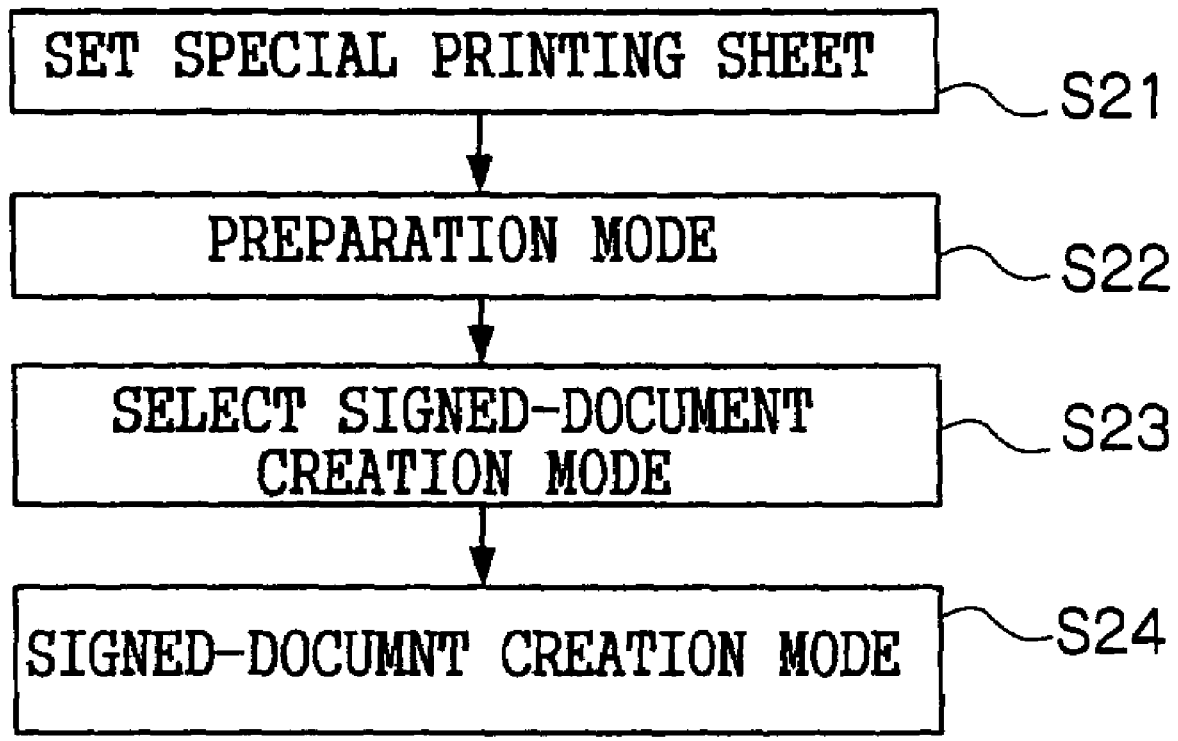
FIG. 9 is a flowchart used to explain the operation of a preparation mode for creating signed documents according to a fourth embodiment.

FIG. 9 is a flowchart used to explain the operation of a preparation mode for creating signed documents by setting special printing sheets.

In the case of a signed-document creation mode for printing authentic documents and copies separately by switching sheets, when special printing sheets or a sheet cassette for special printing is set, the apparatus enters a preparation mode for creating signed documents (S21 and S22).

Thereafter, a signed-document creation mode becomes selectable, and when the signed-document creation mode is selected by the user, the signed-document creation mode starts (S23 and S24).

After the signed-document creation mode starts, the same operation as in the first embodiment is carried out.

As described above, according to the fourth embodiment, the apparatus is arranged such that the apparatus enters the preparation mode for the signed-document creation mode by setting special printing sheets or a sheet cassette for special printing, and thus a signed-document creation function can be provided in a digital copy machine, which does not have the function of creating signed documents in normal operation, by the user setting the above described sheets.

(E) Other Embodiments (E-1) Although in the above described first to fourth embodiments, an image forming apparatus according to the present invention has been described as a digital copy machine, the present invention is not limited to digital copy machines; it is widely applicable to other types of printers, multi functional peripherals (MFPs), and the like.

For example, in applying an image forming apparatus according to the present invention to a printer which is connectable to a terminal such as a PC, signed authentic documents or copies may be created according to signature information obtained from an operation section which is integrated with a keyboard or which can be used independently from a keyboard.

(E-2) In the above described first to fourth embodiments, if the printer allows color printing, in printing a user's signature, printing may be performed by graphically drawing the signature colored in blue, red, or the like. Further, outline characters on a colored background may be printed depending on the underlying layers of sheets.

Color selection determining means may then be provided in an operation section 16, and thus the graphical drawing of a signature may be colored according to a color the user designates.

(E-3) Although in the above described first to fourth embodiments, it has been described that signature information stored in a signature memory 19 is deleted after completion of printing or when the power is turned off, the signature information may be deleted after getting permission from the user, and if the permission for deleting the signature cannot be obtained, the signature information may be stored and maintained in the signature memory 19.

In such a manner, the signature information can be read out from the signature memory 19 again, and a signed-document can be made using the signature information.

Further, in using the signature information stored in the signature memory 19 again as described above, the signature information and a corresponding password known by a person who is permitted to use the signature may be stored, and when using the signature, an identification process may be carried out using the input password to permit use of signature information if the result of the identification result is determined to be correct.

(E-4) An image forming apparatus according to the present invention may be applied to a communication apparatus allowing electronic mail communication.

For example, signature information may be provided in a sent mail message, and thus a signed mail can be transmitted to another party. Likewise, a received mail message may be provided with signature information and a signed mail can be transmitted in return.

Further, an image forming apparatus according to the present invention may be applied to a printer which can be connected to a communication apparatus allowing electronic mail communication.

In the above described first to fourth embodiments, printing of documents is carried out by synthesizing image data from a scanner 24 and signature information. However, in these embodiments, signature information may be included in a received mail message (received data) and then authentic documents or copy documents can be printed.

What is claimed is:

1. An image forming apparatus comprising:
    a function selection/designation section that obtains a designation of selection of a signed-document creation mode for creating at least a signed authentic document and/or a copy thereof;
    a signature position designation section that obtains a designation of a signature position on a printing sheet;
    a signature input section that obtains signature information input by handwriting;
    a signature temporary storage section that temporarily stores the signature information from said signature input section;
    an image obtaining section that obtains image data of an original to be provided with the signature;
    a signature/image synthesizing section that synthesizes the signature information in said signature temporary storage section and the image data in said image obtaining section so that the signature is provided at the designated signature position on the printing sheet; and a printout section that prints out a signed document or documents based on the data synthesized in said signature/image synthesizing section, in such a manner that a designated number of signed authentic documents are discriminated from their copies, wherein, when printing of the signed-document is completed, said signature temporary storage section deletes the signature information stored therein.

2. The image forming apparatus according to claim 1, said printout section comprising a sheet cassette that stores at least special sheets for authentic documents, wherein, when an instruction to create a signed authentic document or documents is given, said printout section takes out a special sheet or sheets from said sheet cassette for authentic documents, and prints a designated number of signed authentic documents.

3. The image forming apparatus according to claim 2, wherein the special sheets for authentic documents have been subjected to special printing which, when an authentic document printed on any of the special sheets is copied, shows that the copied document is a copy.

4. The image forming apparatus according to claim 1, comprising a special printing section that carries out predetermined special printing on an underlying layer of a printing sheet, to prevent copying of a document or tampering of the contents thereof, or to show that a document is a copy document, wherein said printout section prints out a signed-document on a printing sheet subjected to special printing by said special printing section.

5. The image forming apparatus according to claim 1, comprising an identification section that stores an identification number correspondingly to the signature information stored in said signature temporary storing section and determines whether or not an input identification number is correct, wherein, if said identification section determines that the input identification number is correct, the signature information can be read out from said signature temporary storing section.

6. The image forming apparatus according to claim 1, comprising:

a flag providing section that, upon completion of printing of the designated number of signed authentic documents or copies, provides the synthesized data in said signature/image synthesizing section, with a flag which shows that printing of a signed authentic document or documents, or a signed copy document or documents has been completed, according to the signed-document creation mode selected and designated; and a flag detection section that detects the flag provided in the synthesized data, wherein, when said flag detection section has detected the flag, said printout section prints out a signed copy or copies, or a signed authentic document or documents.

7. The image forming apparatus according to claim 6, said printout section comprising a sheet cassette that stores at least special sheets for authentic documents, wherein, upon an instruction to create a signed authentic document or documents, said printout section takes out a special sheet or sheets from the sheet cassette for authentic documents, and prints a designated number of signed authentic documents.

8. The image forming apparatus according to claim 7, wherein the special sheets for authentic documents are sheets which have been subjected to special printing to show, when an authentic document is copied on any of the special sheets, that the copied document is a copy.

9. The image forming apparatus according to claim 6, comprising a special printing section which performs a predetermined special printing on an underlying layer of each printing sheet, which prevents copying of the contents of a document or tampering thereof, or shows that a document is a copy document, wherein said printout section prints out a signed-document on a printing sheet already having been subjected to special printing by said special printing section.

* * * * *